United States Patent [19]

Isakson

[11] 4,206,455

[45] Jun. 3, 1980

[54] PISTON OVERTRAVEL INDICATOR

[75] Inventor: Larry E. Isakson, Owosso, Mich.

[73] Assignee: Midland-Ross Corporation, Cleveland, Ohio

[21] Appl. No.: 914,050

[22] Filed: Jun. 9, 1978

[51] Int. Cl.[2] ........................ G08B 21/00; B60Q 1/26; H01H 35/38

[52] U.S. Cl. .............................. 340/626; 33/DIG. 15; 92/5 R; 116/272; 116/280; 137/806; 200/82 D; 340/52 C

[58] Field of Search ............... 340/548, 605, 626, 611, 340/614, 52 C, 617; 200/82 R, 82 C, 252-261, 82 D; 92/5 R; 137/806; 73/308, 313, 319, 321, 322; 33/DIG. 15; 116/272, 280

[56] References Cited

U.S. PATENT DOCUMENTS 3,196,618 7/1965 Farmery et al. ........................ 92/5 R 3,997,887 12/1976 Poynter ................................ 137/806

4,041,449 8/1977 Shellhause .......................... 340/52 C

*Primary Examiner*—John W. Caldwell, Sr.

*Assistant Examiner*—Daniel Myer

*Attorney, Agent, or Firm*—H. Duane Switzer

[57] ABSTRACT

An overtravel indicator for a piston received in a cylinder having an end wall toward which the piston moves includes an elongated indicator rod slidably extending through the end wall. The rod has an armed position extending inwardly of the end wall and an operated position extending outwardly of the end wall. An electrically operated indicator is positioned in a circuit connected for completion through the indicator rod and end wall when the rod is in its operated position. In the armed position of the rod, dielectric material surrounds that portion of the rod extending through the end wall for opening the electric circuit. In the operated position of the rod, its outer surface engages the end wall for completing the electric circuit.

12 Claims, 4 Drawing Figures

PISTON OVERTRAVEL INDICATOR

BACKGROUND OF THE INVENTION

This application pertains to the art of indicators and, more particularly, to indicators for indicating overtravel of a piston. The invention is particularly applicable for use in a pressure converter for converting pneumatic pressure to hydraulic pressure. However, it will be appreciated that the invention has other aspects and may be used with other cylinders or other devices which overtravel.

Piston overtravel indicators of a known type include that disclosed in U.S. Pat. No. 3,997,887 issued Dec. 14, 1976, to Poynter. In this indicator arrangement, an elongated indicator rod extends slidably through a cylinder end wall toward which a piston moves. The indicator rod has an inwardly extending armed position and is engageable by the piston upon overtravel thereof toward the end wall for movement to an outwardly extended operated position. An independent switch assembly is mounted to the end wall and has a plunger engageable with the indicator rod for operating the switch when the rod is moved to its operated position. An indicator assembly of the type described is relatively expensive to manufacture and assemble, and requires maintenance in the event the switch assembly fails.

In another known arrangement, a separate switch assembly is not used and an electrical circuit is completed when the piston engages the indicator rod. However, once the piston moves back from a slight overtravel position, the electric circuit is again opened. Momentary operation of the overtravel indicator in this manner can result in a failure of an operator to see or hear the indicator. It would be desirable to have an arrangement wherein a separate switch assembly was not required, and wherein the indicator would remain on once it was operated even though the piston is retracted from an overtravel position.

SUMMARY OF THE INVENTION

A piston overtravel indicator of the type described has an electrically operated indicator positioned in a circuit connected for completion through the indicator rod and the cylinder end wall when the rod moves to its operated position. In the armed inwardly extending position of the indicator rod, dielectric material surrounds that portion of the rod extending through the end wall for maintaining an open circuit.

In a preferred arrangement, biasing means is provided for laterally biasing the indicator rod to insure good electrical conductive engagement between the rod and cylinder end wall.

The biasing means or abutment means for laterally biasing the indicator rod and releasably retaining same in its armed position includes a bushing mounted to the cylinder end wall coaxially with a hole through which the indicator rod extends. The bushing carries the abutment means for cooperating with a circumferential groove in the rod to releasably retain the rod in its inwardly extending armed position. Upon engagement of the rod by the piston during overtravel thereof, the abutment means yields generally radially outwardly for allowing outward movement of the indicator rod. In one arrangement, the abutment means comprises an elastomeric O-ring received in a bushing groove which is eccentric to the longitudinal axis of the hole through which the rod extends. The eccentricity of the bushing groove causes the O-ring to exert different forces on opposite sides of the indicator rod. In another arrangement, the abutment means carried by the bushing is an integral spring finger.

It is a principal object of the present invention to provide an improved piston overtravel indicator.

It is an additional object of the invention to provide a piston overtravel indicator which does not require an independent switch assembly.

It is a further object of the invention to provide an improved piston overtravel indicator having an improved abutment means for releasably retaining an indicator rod in an armed position.

DESCRIPTION OF PREFERRED EMBODIMENTS

Figure 1:
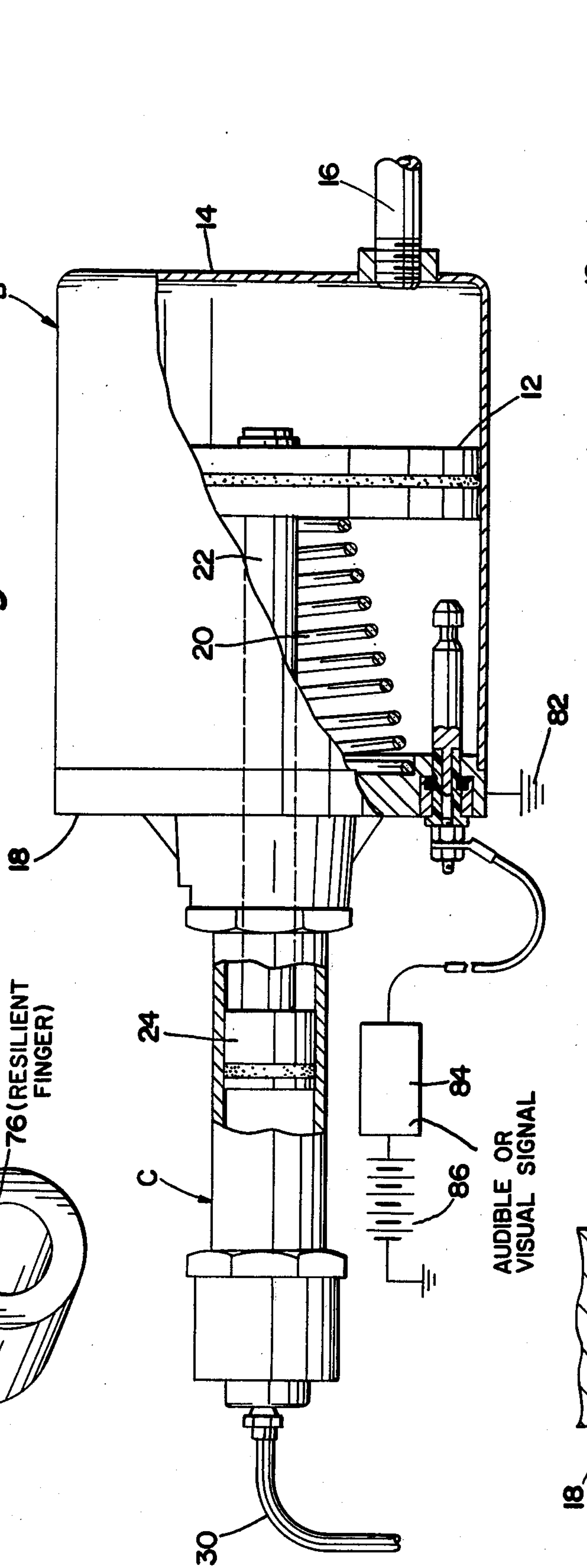
FIG. 1 is a side elevational view of a pressure converter having the improved indicator of the present application incorporated therein, and with portions cut away and in section for clarity of illustration.

With reference to the drawing, FIG. 1 shows a pressure converter including a pneumatic cylinder B connected with a hydraulic cylinder C. A pneumatic piston 12 positioned within cylinder B is shown in an intermediate position of travel, and normally occupies a rest position adjacent one cylinder end 14. Pneumatic pressure supplied to cylinder B as through conduit 16 causes movement of pneumatic piston 12 from its normal rest position adjacent one cylinder end 14 to the left in FIG. 1 toward other cylinder end 18. Piston 12 travels to normal working positions in the general vicinity of the solid line position shown. A coil spring 20 acts between piston 12 and other cylinder end 18 for normally returning piston 12 to its rest position adjacent cylinder end wall 14.

Pneumatic piston 12 is connected by a rod 22 with a hydraulic piston 24 within hydraulic cylinder C. Pneumatic pressure acting on pneumatic piston 12 is transmitted through rod 22 to hydraulic piston 24 for providing hydraulic output pressure through conduit 30. In the event of a failure or leak in the hydraulic devices operated by pressure through conduit 30, pneumatic piston 12 will overtravel from the general vicinity of the solid line position shown toward other cylinder end wall 18. When such overtravel of piston 12 occurs, an indicator is operated for informing the equipment operator that a malfunction has occurred or that an adjustment is required.

End wall 18 has a hole 34 therethrough and the axis of such hole extends parallel to the direction of movement of piston 12. An enlarged bore 36 in end wall 18 coincidental with hole 34 receives a bushing H of FIG. 2 or a bushing I of FIG. 3.

Bushing H has a bushing circumferential groove 40 therein having an axis which is eccentric to the axis of end wall hole 34 and central bushing hole 42.

Figure 2:
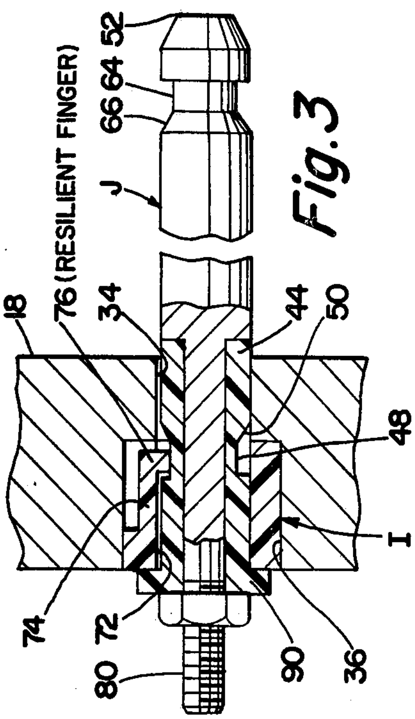
FIG. 2 is an enlarged cross-sectional elevational view of an indicator rod assembly constructed in accordance with the present application.

An elongated metal indicator rod J extends through coaxial holes 34 and 42 as shown in FIG. 2. Rod J is shown in FIGS. 1 and 2 in an inwardly extended armed position. In the armed position of rod J, that portion thereof extending through end wall 18 is covered by a suitable dielectric material 44, such as plastic. That portion of rod J covered by dielectric material 44 is reduced in diameter in order that rod J has a substantially uniform diameter along its entire length. A circumferential rod groove 48 is provided in dielectric material 44 and groove 48 has one sloping groove sidewall 50 which slopes outwardly from the bottom of groove 48 in a direction toward the inner end 52 of rod J.

An elastomeric O-ring 60 is carried by bushing H by being received in bushing groove 40. Due to the eccentric location of bushing groove 40 relative to the longitudinal axis of holes 34, 42, O-ring 60 is squeezed tighter on one side of rod groove 48 than on the other side thereof. Therefore, O-ring 60 defines a biasing means or abutment means for laterally biasing rod J into firm engagement with the peripheral wall of hole 34. O-ring 60 also defines an abutment means for releasably retaining rod J in its armed position shown. When piston 12 engages rod end 52, rod J is displaced axially to the left because sloping groove sidewall 50 will cam O-ring 60 radially outwardly for allowing movement of rod J therepast. That portion of rod J which is not coated with dielectric material will then be biased into firm engagement with the peripheral wall of hole 34 by the force of O-ring 60. Rod J has a circumferential groove 64 adjacent its inner end 52 for cooperation with O-ring 60 to prevent complete outward displacement of rod J through end wall 18. A sloping cam sidewall 66 of groove 64 allows rod J to be manually pushed back into an armed position after a defect has been corrected.

Figure 3:
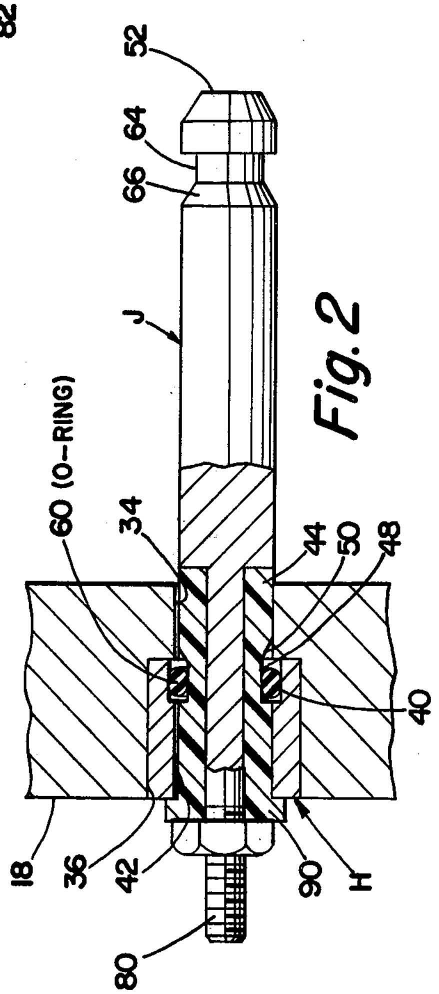
FIG. 3 is a cross-sectional elevational view similar to FIG. 2 and showing another embodiment.
Figure 4:
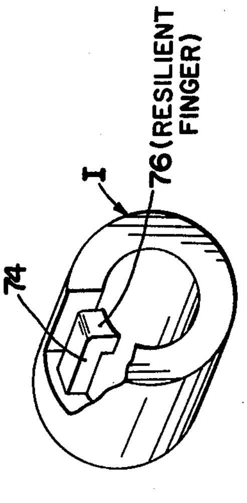
FIG. 4 is a perspective illustration of a bushing used with the embodiment of FIG. 3.

In the arrangement of FIG. 3, rod J extends through end wall hole 34 and bushing hole 72. Bushing I includes an axially extending resilient finger 74 having a projection 76 extending into rod groove 48. Thus, finger 74 and projection 76 define a yieldable abutment means or a resilient biasing means for releasably retaining rod J in its armed position and for resiliently biasing rod J laterally. Engagement of piston 12 with inner rod end 52 causes sloping groove sidewall 50 to cam against projection 76 for moving finger 74 generally radially outwardly and allow rod J to move to the left in FIG. 3. Finger 74 and projection 76 will continue to exert a lateral biasing force on rod J to maintain firm engagement of rod J with the periphery of end wall hole 34.

Outer end portion 80 of rod J is threaded or otherwise suitably provided with means for connecting same in an electrical circuit. In the arrangement shown, the outer end portion of rod J is threaded for receiving nuts to clamp an electrical connector thereto. Cylinder B and end wall 18 are suitably grounded as indicated at 82. An audible or visual indicating device 84, such as a warning light or buzzer, is positioned in an electrical circuit connected with a battery 86. Therefore, the electrical circuit containing indicating means 84 is connected for completion through indicator rod J and end wall 18. With rod J in its armed position, dielectric material 44 extends through hole 34 so the electrical circuit is open and indicating means 84 is not operative. When piston 12 overtravels for projecting rod J outwardly, the outer conducting surface portion of rod J engages the peripheral wall of hole 34 to complete the electric circuit and operate indicating means 84. The abutment means or biasing means defined by O-ring 60 or finger 74 retain rod J in the outwardly extended position until it is manually reset. Therefore, any momentary overtravel of piston 12 will operate indicating means 84 and maintain same operated until the defect causing the overtravel is corrected.

Instead of having dielectric material 44 on the outer end portion of rod J, it will be recognized that it is possible to have same on the inner end portion thereof. In such an arrangement, an electrical circuit would be completed through rod J in its inward armed position, and the circuit would be broken when rod J was extended outwardly due to piston overtravel.

The hole and bushing arrangement through cylinder end wall 18 defines a mounting means for mounting rod J through end wall 18. The mounting means is connected as to ground 82 for completing the circuit through rod J.

An outwardly extending flange 90 is provided as part of dielectric material 44 on the outside of end wall 18 to serve as a stop for the electrical connection and to space the electrical connection on the rod from the outer surface of end wall 18. Instead of providing a flange on material 44, it is possible to provide a separate washer of dielectric material.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. An overtravel indicator for a piston positioned in a cylinder having an end wall toward which said piston moves, said end wall including mounting means for slidably mounting an elongated rod therethrough for movement between an armed position projecting into said cylinder through said end wall and an operated position projecting out of said cylinder through said end wall, said mounting means having an electrically conductive rod engaging portion, said rod having an electrically conductive length portion on the outer surface thereof, electrically operated indicator means for indicating overtravel of said piston, said indicator means being in an electric circuit connected for completion through said conductive rod engaging portion and said conductive length portion, and said conductive length portion being in engagement with said rod engaging portion in one of said positions of said rod and being out of engagement therewith in the other position of said rod.

2. The indicator of claim 1 including cooperating releasable abutment means between said rod and mounting means for releasably holding said rod in said armed position.

3. The indicator of claim 2 wherein said abutment means includes biasing means on said mounting means for biasing said rod laterally for firmly engaging said conductive rod portion with said conductive rod engaging portion of said mounting means.

4. The indicator of claim 1 wherein said rod is made of electrically conductive material and is divided into said conductive length portion and a nonconductive length portion by having its outer surface along said nonconductive length portion covered with dielectric material.

5. An overtravel indicator for a piston positioned in a cylinder having an electrically conductive end wall toward which said piston moves, a hole through said end wall slidably receiving an elongated electrically conductive rod for movement between an armed position projecting into said cylinder through said end wall and an operated position projecting out of said cylinder through said end wall, said rod in said armed position thereof having an inner end portion received in said cylinder and an outer end portion extending through said hole, said outer end portion being covered by dielectric material, an electric circuit including an electrically operated indicator, said circuit being connected for completion through said end wall and said inner end portion of said rod, and said circuit being open when said outer end portion of said rod extends through said hole and being completed when said rod moves outwardly of said cylinder for engaging said inner end portion of said rod with the wall of said hole.

6. The indicator of claim 5 including yieldable biasing means for laterally biasing said rod into engagement with the wall of said hole.

7. The indicator of claim 6 wherein said hole has a hole axis, a circumferential groove around said hole and having a groove axis eccentric to said hole axis, an elastomeric O-ring positioned in said groove and bearing against said rod with unequal pressures on opposite sides thereof to define said biasing means.

8. The indicator of claim 6 including a bushing of dielectric material mounted in said end wall substantially coincidental with said hole, and said bushing having a resilient finger engaging said rod to define said biasing means.

9. An overtravel indicator for a piston positioned in a cylinder having an end wall toward which said piston moves, a hole in said end wall slidably receiving an elongated indicator rod movable between an armed position extending inwardly of said cylinder and an operated position extending outwardly of said cylinder, said rod having a circumferential groove therein located within said hole in said armed position of said rod, a bushing mounted to said end wall in alignment with said hole, said bushing including yieldable abutment means extending into said groove for releasably holding said rod in said armed position, said rod being engageable by said piston upon overtravel of said piston toward said end wall to force said abutment means generally radially outwardly of said groove and move said rod axially outwardly of said end wall.

10. The indicator of claim 9 wherein said bushing has a circumferential bushing groove therein eccentric to said hole, and an elastomeric O-ring received in said bushing groove and extending into said circumferential groove in said rod to define said abutment means.

11. The indicator of claim 8 wherein said bushing has an integral resilient finger thereon projecting into said circumferential groove in said rod to define said abutment means.

12. The indicator of claim 9 wherein that portion of said rod extending through said hole in said armed position of said rod is covered with dielectric material and that portion of said rod extending inwardly of said cylinder has an electrically conductive surface, an electric circuit including indicating means for indicating overtravel of said piston, said circuit being connected for completion through said cylinder end wall and said electrically conductive surface, said circuit being open with said rod in said armed position and being completed when said rod moves to said operated position by engagement of said conductive surface with the peripheral wall of said hole, and said abutment means biasing laterally against said rod for firmly engaging said conductive surface thereof with said peripheral wall of said hole.

* * * * *